United States Patent [19]
Junge

[11] Patent Number: 5,701,802
[45] Date of Patent: Dec. 30, 1997

[54] MULTIPART PISTON FOR AN INTERNAL COMBUSTION ENGINE

[75] Inventor: Klaus Junge, Burscheid, Germany

[73] Assignee: AE Goetze GmbH, Burscheid, Germany

[21] Appl. No.: 743,823

[22] Filed: Nov. 5, 1996

[30] Foreign Application Priority Data

Nov. 21, 1995 [DE] Germany .................. 195 43 359.9

[51] Int. Cl.[6] .................................................. F16J 1/14
[52] U.S. Cl. .................. 92/190; 92/216; 92/219; 92/255; 123/193.6
[58] Field of Search .................. 92/216, 219, 189, 92/190, 255; 123/193.6

[56] References Cited

U.S. PATENT DOCUMENTS

| | | | |
|---|---|---|---|
| 1,394,898 | 10/1921 | Harriman | 92/189 |
| 1,433,987 | 10/1922 | Deibert | 92/189 |
| 1,463,245 | 7/1923 | Bolan | 92/216 |
| 1,482,675 | 2/1924 | Childers | 92/216 |
| 1,955,226 | 4/1934 | Chavannes | 92/189 |
| 4,013,057 | 3/1977 | Guenther | 123/193.6 |

FOREIGN PATENT DOCUMENTS

| | | | |
|---|---|---|---|
| 26 20 910 | 11/1976 | Germany . | |
| 35 42 800 | 5/1987 | Germany . | |
| 139816 | 3/1953 | Sweden | 92/189 |
| 1566141 | 5/1990 | U.S.S.R. | 92/189 |
| 93/11353 | 6/1993 | WIPO . | |

*Primary Examiner*—Thomas E. Denion
*Attorney, Agent, or Firm*—Spencer & Frank

[57] ABSTRACT

An engine piston includes a piston head; a first bearing block forming a one-piece component with the piston head and having a first bearing face; a piston skirt being a component separate from the piston head; a second bearing block forming a one-piece component with the piston skirt and having a second bearing face; and a coupling device for interconnecting the piston head and the piston skirt and for interconnecting the first and second bearing blocks with one another. The first and second bearing faces complement one another to form a bearing for rotatably supporting a connecting rod.

7 Claims, 2 Drawing Sheets

MULTIPART PISTON FOR AN INTERNAL COMBUSTION ENGINE

This application claims the priority of German Application No. 195 43 359.9 filed Nov. 21, 1995, which is incorporated herein by reference.

BACKGROUND OF THE INVENTION

This invention relates to a piston for an internal combustion engine and is of the type which has a piston head and a separate piston skirt. The piston head and the piston skirt have bearing faces and are coupled to one another by a connecting element.

Pistons for an internal combustion engine are known in which the upper piston part (piston head) is made of steel or iron and the lower piston part (piston skirt) is made of an aluminum alloy. German Offenlegungsschrift (application published without examination) No. 26 20 910 discloses a piston having a separate piston head and piston skirt. In addition to the head and skirt portions, the piston further has a wrist pin which interconnects the upper piston part (piston head), the lower piston part (piston skirt) and the connecting rod. An articulated connection between the upper and lower piston parts as well as a functional separation is thus provided. The upper part or piston head seals the hot combustion gases and transmits the gas force to the connecting rod. The lower part or piston skirt takes up only the lateral forces introduced by the crank drive. In the conventional piston, the bearing member for the connecting rod is arranged in the piston head and is connected therewith as a one-piece component. At the outer periphery of the bearing member connecting elements extend to the piston skirt to connect the piston head with the piston skirt.

It is a disadvantage of the known piston construction that the piston as a whole is composed of a relatively large number of individual components which have to be connected to one another in a complicated manner. Thus, several individual components have to be manufactured, assembled, interconnected and tightened to one another.

SUMMARY OF THE INVENTION

It is an object of the invention to provide an improved engine piston of the above-outlined type in which the number of individual components is reduced and therefore a more simple assembly of the individual components is achieved.

This object and others to become apparent as the specification progresses, are accomplished by the invention, according to which, briefly stated, the engine piston includes a piston head; a first bearing block forming a one-piece component with the piston head and having a first bearing face; a piston skirt being a component separate from the piston head; a second bearing block forming a one-piece component with the piston skirt and having a second bearing face; and a coupling device for interconnecting the piston head and the piston skirt and for interconnecting the first and second bearing blocks with one another. The first and second bearing faces complement one another to form a bearing for rotatably supporting a connecting rod.

DESCRIPTION OF THE PREFERRED EMBODIMENT

Figure 1:
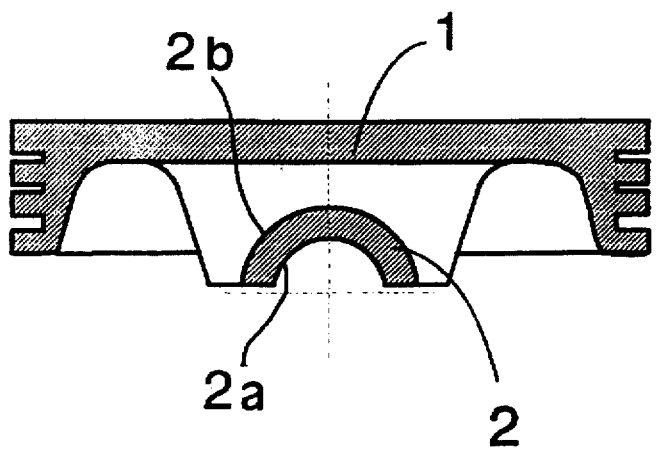
FIG. 1 is an axial sectional view of a piston head according to a preferred embodiment of the invention.

FIG. 1 illustrates a piston head 1 made, for example, of nodular cast iron and including, as a one-piece component therewith, a semi-cylindrical bearing block, 2 which has a semi-cylindrical bearing face 2a and an outer cylindrical surface 2b.

Figure 2:
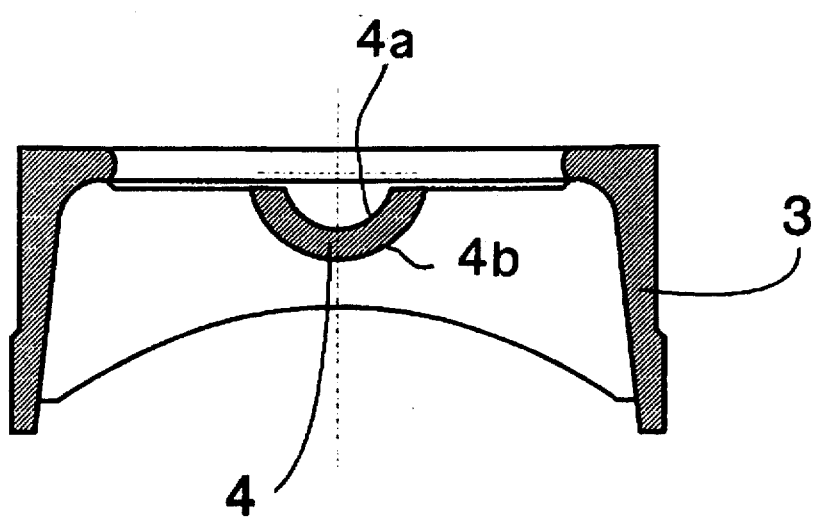
FIG. 2 is an axial sectional view of a piston skirt according to the preferred embodiment.

FIG. 2 shows a piston skirt 3 made of aluminum and including, as a one-piece component therewith, a semi-cylindrical bearing block 4 which has a semi-cylindrical bearing face 4a and an outer cylindrical surface 4b. The piston skirt 3 may be made of two segments.

Figure 3:
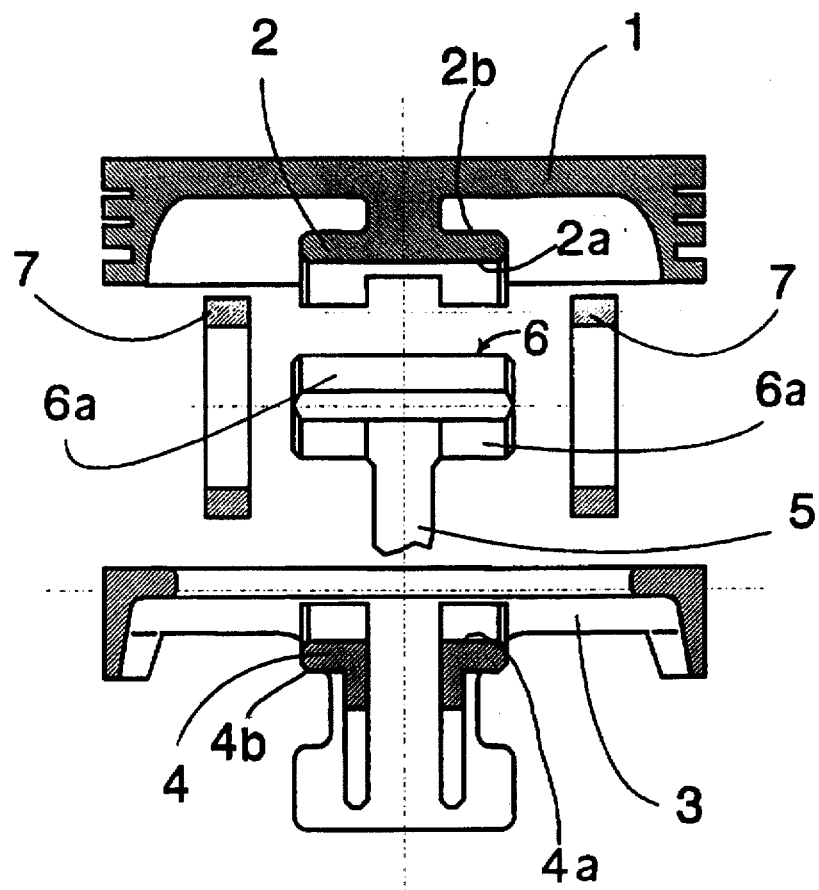
FIG. 3 is an axial sectional exploded view of the piston according to the preferred embodiment.
Figure 4:
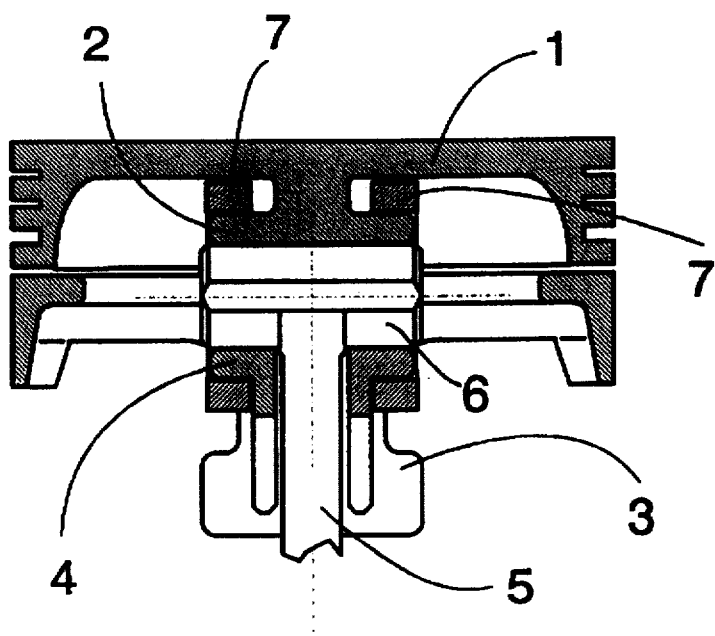
FIG. 4 is an axial sectional view of the assembled piston according to the preferred embodiment.

The exploded view of FIG. 3 shows a connecting rod 5 having a rod head 6 formed of bilaterally oppositely extending pins 6a and two holding bodies (rings) 7. For assembling the piston components 1–6, the rod head 6 is pressed against the bearing face 2a of the bearing block 2 of the piston head 1. Further, the bearing face 4a of the bearing block 4 of the piston skirt 3 is pressed against the rod head 6 and thereafter the two holding rings 7 are laterally inserted on the outer surfaces 2b and 4b of the respective bearing blocks 2 and 4. The holding rings 7 engage loosely the outer surfaces 2b and 4b of the bearing blocks 2 and 4 and are held by additional securing rings (not shown). In this manner the interconnected components may freely move relative to one another. In the assembled state the bearing faces 2a and 4a form a cylindrical bearing for the rod head 6 as shown in FIG. 4.

It will be understood that the above description of the present invention is susceptible to various modifications, changes and adaptations, and the same are intended to be comprehended within the meaning and range of equivalents of the appended claims.

What is claimed is:

1. An engine piston comprising
   (a) a piston head;
   (b) a first bearing block forming a one-piece component with said piston head and having a first bearing face;
   (c) a piston skirt being a component separate from said piston head;
   (d) a second bearing block forming a one-piece component with said piston skirt and having a second bearing face; and
   (e) coupling means for interconnecting said piston head and said piston skirt to provide for a relative motion between said piston head and said piston skirt and for interconnecting said first and second bearing blocks with one another; said first and second bearing faces complementing one another to form a bearing for rotatably supporting a connecting rod.

2. The engine piston as defined in claim 1, wherein said first and second bearing faces together form a hollow cylinder.

3. The engine piston as defined in claim 1, wherein said first and second bearing blocks have respective outer surfaces; and further wherein said coupling means comprise holding bodies inserted on said first and second bearing blocks; said holding bodies engaging said outer surfaces of said first and second bearing blocks.

4. The engine piston as defined in claim 3, wherein said first and second bearing faces are semi-cylindrical.

5. The engine piston as defined in claim 3, wherein said holding bodies are securing rings.

6. An engine piston comprising
   (a) a piston head;
   (b) a first bearing block forming a one-piece component with said piston head and having a first bearing face;
   (c) a piston skirt being a component separate from said piston head;
   (d) a second bearing block forming a one-piece component with said piston skirt and having a second bearing face;
   (e) a connecting rod having a rod head; and
   (f) coupling means for interconnecting said piston head and said piston skirt to provide for a relative motion between said piston head and said piston skirt and for interconnecting said first and second bearing blocks with one another; said first and second bearing faces complementing one another to form a bearing for rotatably supporting said connecting rod at said rod head.

7. The engine piston as defined in claim 6, wherein said rod head is composed of oppositely extending pins received by said bearing.

* * * * *